US008763252B2

(12) United States Patent
Rombach

(10) Patent No.: US 8,763,252 B2
(45) Date of Patent: Jul. 1, 2014

(54) METHOD AND DEVICE FOR SECURING A DISPLAY ELEMENT

(75) Inventor: Stefan Rombach, Bienne (CH)

(73) Assignee: Eta SA Manufacture Horlogère Suisse, Grenchen (CH)

( * ) Notice: Subject to any disclaimer, the term of this patent is extended or adjusted under 35 U.S.C. 154(b) by 127 days.

(21) Appl. No.: 13/298,942

(22) Filed: Nov. 17, 2011

(65) Prior Publication Data

US 2012/0124814 A1 May 24, 2012

(30) Foreign Application Priority Data

Nov. 23, 2010 (EP) .................................... 10192203

(51) Int. Cl.
*G04D 3/00* (2006.01)
*B23P 11/00* (2006.01)

(52) U.S. Cl.
USPC ..................... 29/896.32; 29/896.3; 29/525.01

(58) Field of Classification Search
USPC ............... 29/525.01, 896.3, 896.32; 403/345, 403/379.2, 381, 348; 968/270; 368/236, 368/237, 312–314, 316, 317
See application file for complete search history.

(56) References Cited

U.S. PATENT DOCUMENTS 1,886,166 A * 11/1932 Colomb ........................ 368/236
3,488,943 A * 1/1970 Giger Urs et al. ............ 368/236
3,523,417 A * 8/1970 Morita Katsuhiko ......... 368/236
3,731,482 A * 5/1973 Glanzmann et al. .......... 368/236
5,699,324 A * 12/1997 Perrot et al. .................. 368/226
6,092,923 A * 7/2000 Perrot ........................... 368/309

FOREIGN PATENT DOCUMENTS

CH 185463 A 7/1936
CH 641371 A5 2/1984
CH 697211 A5 6/2008

OTHER PUBLICATIONS

Definition of “assemble”, Merriam-Webster Online Dictionary, accessed Oct. 7, 2013, http://www.merriam-webster.com/dictionary/assemble.*

Definition of “notch”, Merriam-Webster Online Dictionary, accessed Oct. 7, 2013, http://www.merriam-webster.com/dictionary/notch.*

Definition of “notch”, Dictionary.com, accessed Oct. 7, 2013, http://dictionary.reference.com/browse/notch?s=t&path=/.*

European Search Report for EP 10 19 2203 dated Dec. 21, 2010.

* cited by examiner

*Primary Examiner* — Alexander P Taousakis
*Assistant Examiner* — Matthew P Travers
(74) *Attorney, Agent, or Firm* — Sughrue Mion, PLLC

(57) ABSTRACT

Device for securing and locking a display element (1) mounted on a support (3) using at least one assembly element (2) in a direction of assembly (D). The device includes at least one locking element (4) for the assembly element (2) and the locking element (4) is accessible from the visible side (11) of the display element (1).

7 Claims, 1 Drawing Sheet

METHOD AND DEVICE FOR SECURING A DISPLAY ELEMENT

CROSS-REFERENCE TO RELATED APPLICATIONS

This application claims priority from European Patent Application No. 10192203.7 filed Nov. 23, 2010, the entire disclosure of which is incorporated herein by reference.

BACKGROUND

1. Field

The present invention relates to the field of horology. More specifically, it concerns a method of securing a display member, such as a watch dial. The invention also concerns a device for securing and locking a display device for implementing this securing method.

2. Related Art

For the assembly of dials on plates or watch movements, dials which have feet are known, particularly for middle and top of the range watches. The feet, which form parts that protrude underneath the dial, are generally soldered rather than directly machined integrally with the dial and are then driven into recesses under the dial. A variant consists in machining holes in the dial and driving feet into these orifices.

As an alternative or in addition to driving in the dial feet in order to lock the position thereof, there are other known securing methods and devices using keys or screws. However, in this case, the access to the screws or keys is relatively impractical, since access is either through the side or the rear face of the dial, in particular to maintain the attractive appearance of the watch by concealing the locking parts. In the latter case, as for the solution disclosed, for example, in FR Patent No 2324036 by the Applicant, the dial has to be turned over after it has been assembled to the plate in order to access the locking parts, which requires an additional handling step during the assembly process.

There therefore exists a need for solutions for locking display elements which are free of the limitations of the known prior art.

SUMMARY

It is an object of the present invention to propose a securing device and method which are quicker and more practical to implement.

These objects are achieved by a device for securing and locking a display element according to claim 1, characterized in that it includes a locking element that is accessible from the visible side of the display element.

These objects are also achieved by a method of securing a dial according to claim 7, characterized in that the dial locking step is performed immediately after the dial assembly step.

One advantage of the proposed solution is that it allows the locking operation to be performed immediately after the dial assembly operation without any intermediate step. The overall assembly time is thereby reduced.

An additional advantage of the proposed solution is that it simplifies the dial locking operation, owing to the ease of access to the locking elements, which makes handling easier.

Thus, production yields are greatly improved, particularly for automated assembly line production.

Other features and advantages will appear more clearly in the detailed description of various preferred embodiments and the annexed drawings, in which:

DETAILED DESCRIPTION OF EXEMPLARY EMBODIMENTS

Figure 1:
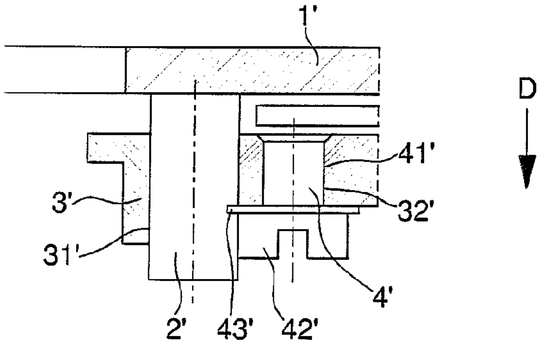
Fig. 1 Prior Art
FIG. 1 is a cross-section of a device for locking a dial known from the prior art.

FIG. 1 shows a solution usually used for locking a dial 1' according to the prior art. The dial foot 2' is engaged in a first bore 31' in a plate 3', and locking key 4' is engaged in a second bore 32' machined on the other side of plate 3' relative to dial 1'. Locking key 4' is formed of a shaft 41' which is engaged in the second bore 32' arranged towards the inside of plate 3', and a head 42' accessible from the other side of plate 3', and a collar 43' coaxial to head 42' but which only extends over part of the periphery thereof. Shaft 41' is driven into second bore 32' and the rotational driving of head 42' causes collar 43' to behave like a knife penetrating into the thickness of the foot in order to lock said foot. However, since the locking key 4' and dial 1' are located on either side of plate 3', it is still necessary to turn plate 3' over in order to be able to access the locking key 4' once the dial has been mounted on the plate, which requires an additional handling step and suitable tools on the production line.

The method and device according to the invention apply more generally to a display element 1 provided with one or several securing elements 2 for assembly on a support 3, and one or several locking elements 4, which are inserted in a locking support 5. This locking support 5 may be distinct from support 3. According to a preferred variant of the invention, support 3 may, for example, consist of a plate 3', whereas locking support 5 may consist of a watch case.

Figure 2A:
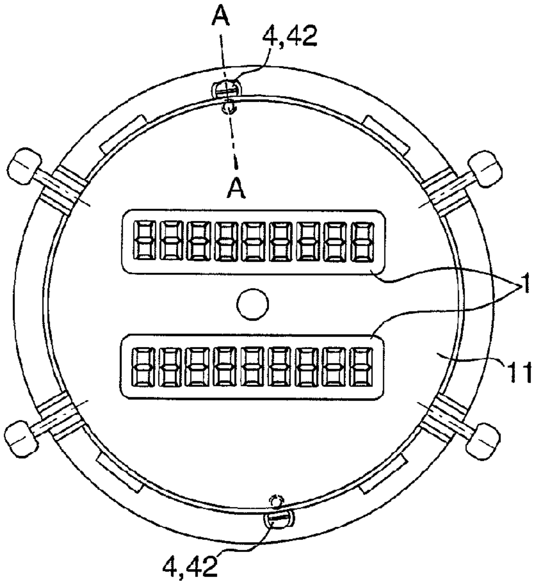
FIGS. 2A and 2B respectively show a top view and a cross-section of the dial assembled on a plate according to a preferred embodiment of the invention.

FIG. 2A shows a top view of a securing and locking device according to a preferred variant of the invention. Display element 1, for instance, typically a dial, here includes digital display means of the LCD (liquid crystal display) type, seen from above by the visible side 11 thereof, and a plurality of locking elements 4 partially covered by the display element 1. This arrangement confers a more attractive appearance on a watch using the device according to the invention, since the locking element heads 42 are partially concealed. Moreover, this arrangement also minimises the total dimensions occupied in width by the display element support 3 on the locking element support 5. These two supports can be formed by the same single piece. Thus, the space requirement of locking elements 4 at the periphery of display element 1 is reduced and allows other parts to be housed more easily for a given surface area.

Figure 2B:
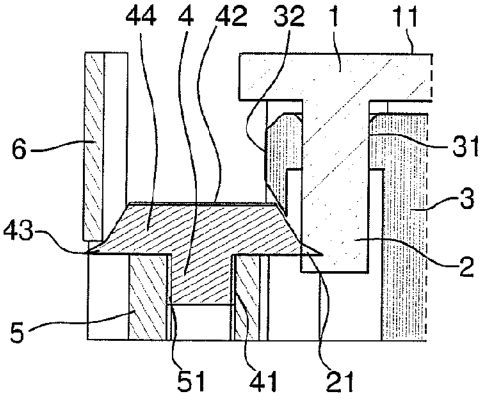

FIG. 2B shows a cross-section of the securing and locking device of FIG. 2A in the locked position along axis A-A. It shows display element 1, and the visible side 11 of display element 1 on the top, the display means assembly elements 2 which are inserted in a bore 31 of display element support 3, and the locking element shaft 41 and the locking element head 42, with a truncated collar 43. According to the illustrated preferred embodiment, the truncated surface 44 allows locking element 4 to be easily inserted into a cavity, here formed by the gap between a battery compartment 6 for receiving a battery, and the peripheral, lateral wall of the display element 32. This truncated surface 44 determines the positioning of locking element 4 opposite assembly element 2, which allows it to be moved in the direction of assembly D as far as bore 51 of support 5. Locking element 4 can then be rotated by approximately a quarter of a turn to change to the locked position, which is the position illustrated in FIG. 2B.

According to the illustrated preferred variant, it is seen that the securing and locking device is accessible in direction of assembly D. It is, however, possible to envisage access in a substantially different direction, preferably forming an angle of less than 45 degrees relative to this direction of assembly D, such that locking element 4 is still easily accessible and can be handled without having to move the part after assembly in order to carry out the locking operation. Locking element 4 preferably includes a shaft 41 engaged in a bore 51 arranged in the support 5 thereof at the periphery of display element 1, on the visible side 11 of the display element. It also includes a head 42 which can be rotatably actuated by an external tool engaging in a notch 21, preferably extending along a diameter of the head, like a screw head. A truncated collar 43, concentric to head 41, is engaged in a notch 21 of assembly element 2, located towards the outside of display element 1. This arrangement of notches on the external side of display element 1 is necessary when display element 1 is, for example, a dial, which can only be secured from its visible side via the periphery thereof. According to an alternative embodiment, for a part that for example has a hole, it would, however, be possible to envisage locking said part via locking parts 4 inserted through the orifice. In such case, notches 21 would then be located towards the inside of display element 1.

The arrangement of the various locking parts according to the invention enables the locking operation to be easily performed by rotating head 42, preferably through an angle of less than 180 degrees, which corresponds to a half turn, and preferably of around 90 degrees, i.e. a quarter of a turn, so that the operation is very quick and easy to perform. This rotation of head 42 positions the non-truncated part of the collar in notch 21 of assembly element 4 and can be performed immediately after assembly means 1 has been fixed to its support 3, since head 42 is accessible in the direction of assembly (D) from the visible side 11 of display element 1. Thus, it is no longer necessary to turn the support over to access locking elements 2 from the other side. This arrangement therefore certainly facilitates the locking operations, but it is not natural for those skilled in the art, because of the additional space required for locking parts 4 at the periphery of display element 1, which until now had meant positioning locking elements 4 towards the interior of assembly elements 2 on the opposite side. This solution of the prior art also provided the advantage of enabling locking parts 4 to be easily concealed on the other side of display element 1.

In order to facilitate the insertion of collar 43 in assembly element 2, a harder material than the material of assembly element 2 could be selected to form said collar, to facilitate the penetration thereof in notch 21. It is also possible to envisage not forming any notches in the assembly element prior to the locking operation, and notch 21 could be created simply by the rotation of locking element head 42, owing to the relative difference in hardness between the two materials selected. The fact of reducing the hardness of assembly element 2 for this purpose further facilitates the preliminary operation of driving these elements into their support 3.

Those skilled in the art will understand that other variants may be envisaged without departing from the scope of the invention. In particular, different geometric shapes could be envisaged for locking elements 4 and assembly elements 2, and for the "male" and "female" elements arranged on these elements so that they fit inside each other. These elements are formed by collar 43 and notch 21 according to the preferred embodiment described hereinbefore. It would, however, be possible to arrange one or several female elements on locking element 4 and assembly element 2.

LIST OF REFERENCES

| | |
|---|---|
| 1 | Display element |
| 11 | Visible side of the display means |
| 1' | Dial |
| 2 | Element for assembling display means |
| 21 | Assembly element notch |
| 2' | Dial feet |
| 3 | Display element support |
| 31 | Bore in the display element support |
| 32 | Peripheral lateral wall of the display element |
| 3' | Plate |
| 31' | First bores in the plate |
| 32' | Second bores in the plate |
| 4 | Locking element |
| 41 | Locking element shaft |
| 42 | Locking element head |
| 43 | Locking element collar |
| 44 | Truncated surface of the locking element |
| 4' | Locking key |
| 41' | Locking key shaft |
| 42' | Locking element head |
| 43' | Locking key collar |
| 5 | Locking element support |
| 51 | Bore in the locking element support |
| 6 | Battery compartment |
| D | Direction of assembly |
| A-A | Cross-section Direction of FIG. 2B |

What is claimed is:

1. A device for securing and locking a watch dial pressed on a support using at least one foot in a direction of assembly, wherein said device includes at least one locking element for locking said at least one foot, wherein said locking element is accessible from the visible side of said watch dial for both a locking operation and an unlocking screwing operation.

2. The securing and locking device according to claim 1, including a locking support for said locking element and wherein at least one bore is arranged in said locking support at the periphery of said display element, on a side facing same direction as the visible side of said display element.

3. The securing and locking device according to claim 2, wherein said locking element includes a shaft engaged in said bore, a head and a truncated collar, concentric to said head, but only extending over part of the periphery thereof.

4. The securing and locking device according to claim 3, wherein said collar is engaged in a notch of said assembly element located towards the exterior of said display element.

5. The device according to claim 4, wherein the material selected for said collar is harder than that of said assembly element.

6. The securing and locking device according to claim 4, wherein said locking element is partially covered by said display element.

7. A method of securing and locking a watch dial, including:

a step of securing said watch dial on a support using at least one foot in a direction of assembly, a step of locking said foot using a locking element, wherein said locking step is performed immediately after said assembly step, wherein the locking step is achieved by rotating a head of said locking element with the help of a screwing device engaged in a notch extending along a diameter of said head, wherein said locking element is accessible in the direction of assembly from the visible side of said watch dial, and wherein said locking element includes a truncated collar, concentric to said head but only extending over part of the periphery thereof, engaging in a notch of said assembly element, located towards the exterior of said display element during said rotation of said head of said locking element.

* * * * *